Patented July 23, 1935

2,008,766

UNITED STATES PATENT OFFICE 2,008,766

DYEING PROCESS

Mordecai Mendoza, West Didsbury, and Wilfred Archibald Sexton, Huddersfield, England, assignors to Imperial Chemical Industries Limited, a corporation of Great Britain No Drawing. Application January 20, 1933, Serial No. 652,768. In Great Britain January 29, 1932

10 Claims. (Cl. 8—5)

This invention relates to an improved dyeing process whereby claret dyeings on the fibre of excellent fastness to kier-boiling and chlorine are obtained.

According to the invention we combine on the fibre an arylamide of 2:3-hydroxynaphthoic acid, devoid of sulphonic, carboxylic, or other water-solubilizing groups, with the tetrazo compound of a diamine obtained by condensing two molecular proportions of a primary o-alkoxy-arylamine of the general formula

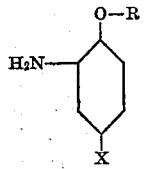

(where R stands for alkyl, and X for hydrogen alkyl, chlorine or bromine), with one molecular proportion of an aromatic aldehyde, for example, benzaldehyde, both arylamine and the aromatic aldehyde being devoid of nitro groups and water-solubilizing groups.

Claret or purple shades of excellent fastness to kier-boiling (cf. Rowe, Journal of the Society of Dyers and Colourists, Feb., 1931, page 33) and chlorine are obtained. The light fastness also is good.

The diamines which are tetrazotized and used in accordance with the invention are new compounds. We mention the following as exemplifying them, but the invention is not restricted to the use of the diamines here specified.

(1) 4:4' - Diamino - 2:2' - dimethyl - 5:5' - dimethoxytriphenylmethane.

This can be prepared as follows. 347 parts of the hydrochloride of 3-amino-4-cresol methyl ether (common cresidine) are added to 200 parts of water and the temperature is raised to 50° C. 106 parts of benzaldehyde are then stirred in and the mixture is then stirred for about 20 hours at 95° C. A small amount of hydrochloric acid is added until a distinct mineral acid reaction to Congo paper is shown and unchanged benzaldehyde is removed by steam distillation. The residue is then made alkaline with caustic soda liquor and again steam distilled to remove any unchanged 3-amino-4-cresol methyl ether. The 4:4' - diamino - 2:2' - dimethyl - 5:5'-dimethoxy-triphenylmethane which remains in suspension is filtered after cooling, well washed with water and dried. When ground it is a light grey powder easily soluble in mineral acids, alcohol, benzene etc., and practically insoluble in water. When crystallized from benzene it melts at 183–184° C.

(2) 2:2' - Dimethyl - 3:3':3''-trimethoxy-4:4'-diaminotriphenylmethane, m. p. 120–126° C.

(3) 3:3':3''-Trimethoxy-4:4'-diaminotriphenylmethane, m. p. 85–90° C.

(4) 3:3' - Dimethoxy - 4:4' - diaminotriphenylmethane.

(5) 2''-Chloro-4:4'-diaminotriphenylmethane.

(6) 2''-Chloro-2:2'-dimethyl-3:3'-dimethoxy-4:4'-diamino-triphenylmethane, m. p. 225–6° C.

(7) 2:2' - Dichloro-4:4'-diamino-5:5'-dimethoxytriphenylmethane.

(8) 2:2' - Dibromo-4:4'-diamino-5:5'-dimethoxytriphenylmethane.

All the above are readily soluble in dilute acids. They are obtained by condensation of the appropriate aldehyde and amine in presence of hydrochloric acid as described in Example (1) above.

The following illustrative example describes how the invention is carried into effect.

4 gms. of the α-naphthylamide of 2:3-hydroxynaphthoic acid are pasted with 9 gms. of Turkey red oil and 16 gms. of caustic soda 76° Tw. The paste is dissolved in 150 cc. boiling water and the solution made up to 1 litre. Cotton yarn is steeped in this solution for half an hour at 35° C., the ratio of volume of solution to weight of cotton being 20:1. The cotton is wrung but not rinsed and then steeped for 30 minutes in a diazo solution made up as follows:—2.28 parts of 4:4'-diamino-2:2'-dimethyl-5:5'-dimethoxytriphenyl-methane are dissolved in 40 parts of water and 3 parts hydrochloric acid 32° Tw. The solution is cooled to 10° and diazotized by addition of 3.8 parts of 20% sodium nitrite. It is then neutralized with sodium acetate and made up to 500 cc. A second solution is made up containing 25 parts salt and 0.5 part acetic acid 50% in 500 parts water. Equal parts of these two solutions are mixed and 200 parts of the mixture used for each 10 gms. of cotton yarn.

The dyed cotton is treated by boiling for a short time with a soap solution containing a small quantity of soda ash. The shade is a bright claret.

Further examples are given in the following table:

| Base tetrazotized | Coupling component | Shade |
|---|---|---|
| 4:4′ Diamino-2:2′-dimethyl-5:5′-dimethoxytriphenyl-methane. | 2:3-Hydroxynaphthoic 4-bromo-o-anisidide. | Claret. |
| Do | 2:3-Hydroxynaphthoic anilide. | Do. |
| Do | 2:3-Hydroxynaphthoic 4-bromo-o-anisidide. | Do. |
| Do | 2:3-Hydroxynaphthoic 5-chloro-o-toluidide. | Do. |
| Do | 2:3-Hydroxynaphthoic α-naphthylamide. | Do. |
| Do | 2:3-Hydroxynaphthoic p-anisidide. | Do. |
| Do | 2:3-Hydroxynaphthoic β-naphthylamide. | Do. |
| Do | 2:3-Hydroxynaphthoic o-anisidide. | Do. |
| 3:3′:3″-Trimethoxy-4:4′-diaminotriphenylmethane. | 2:3-Hydroxynaphthoic anilide. | Do. |
| Do | 2:3-Hydroxynaphthoic p-anisidide. | Do. |
| Do | 2:3-Hydroxynaphthoic β-naphthylamide. | Do. |
| Do | 2:3-Hydroxynaphthoic α-naphthylamide. | Do. |
| Do | 2:3-Hydroxynaphthoic 5-chloro-o-toluidide. | Do. |
| Do | 2:3-Hydroxynaphthoic 4-bromo-o-anisidide. | Do. |
| 2:2′-Dimethyl-3:3′:3″-trimethoxy-4:4′-diaminotriphenylmethane. | 2:3-Hydroxynaphthoic anilide. | Do. |
| Do | 2:3-Hydroxynaphthoic β-naphthylamide. | Do. |
| Do | 2:3-Hydroxynaphthoic p-anisidide. | Do. |
| Do | 2:3-Hydroxynaphthoic 4-bromo-o-anisidide. | Do. |
| Do | 2:3-Hydroxynaphthoic 5-chloro-o-toluidide. | Do. |
| Do | 2:3-Hydroxynaphthoic α-naphthylamide. | Do. |
| 3:3′-Dimethoxy-4:4′-diamino-triphenylmethane. | 2:3-Hydroxynaphthoic anilide. | Do. |
| Do | 2:3-Hydroxynaphthoic p-anisidide. | Do. |
| Do | 2:3-Hydroxynaphthoic 4-bromo-o-anisidide. | Do. |
| Do | 2:3-Hydroxynaphthoic β-naphthylamide. | Do. |
| Do | 2:3-Hydroxynaphthoic α-naphthylamide. | Do. |
| Do | 2:3-Hydroxynaphthoic 5-chloro-o-toluidide. | Do. |
| 2″-Chloro-2:2′-dimethyl-5:5′-dimethoxy-4:4′-diamino-triphenylmethane. | 2:3-Hydroxynaphthoic anilide. | Do. |
| Do | 2:3-Hydroxynaphthoic p-anisidide. | Do. |
| Do | 2:3-Hydroxynaphthoic 4-bromo-o-anisidide. | Do. |
| Do | 2:3-Hydroxynaphthoic α-naphthylamide. | Do. |
| 2″-Chloro-2:2′-dimethyl-3:3′-dimethoxy-4:4′-diaminotriphenylmethane. | 2:3-Hydroxynaphthoic β-naphthylamide. | Do. |
| Do | 2:3-Hydroxynaphthoic 5-chloro-o-toluidide. | Do. |

All the above have excellent fastness to chlorine and kier boiling.

We claim:
1. A process for the production of fast shades on textile materials which comprises coupling on the fiber an arylamide of 2-3-hydroxy-naphthoic acid free from water-solubilizing groups with a tetrazotized diamine being a condensate, free from water-solubilizing groups, of two molecular proportions of a primary O-alkoxy-arylamine of the benzene series with one molecular proportion of an aromatic aldehyde.

2. A process for the production of fast shades on textile materials which comprises coupling on the fiber an arylamide of 2-3-hydroxynaphthoic acid free from water-solubilizing and nitro groups with a tetrazotized diamine being a condensate, free from water-solubilizing groups, of two molecular proportions of a primary O-alkoxy-arylamine of the benzene series, having one of the group, hydrogen, alkyl, chlorine, bromine in a position meta to each associated group, with an aromatic aldehyde.

3. A process for the production of fast shades on textile materials which comprises coupling on the fiber an arylamide of 2-3-hydroxy-naphthoic acid having the following general formula:

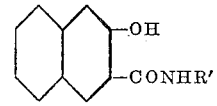

wherein R′ represents an aromatic residue of the benzene or naphthalene series which may have substituted thereon members selected from the class consisting of halogen, alkyl, and alkoxy groups, with a tetrazotized diamine having the following general formula:

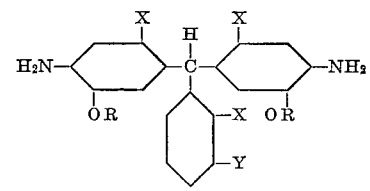

wherein R represents an alkyl group, X represents hydrogen, alkyl, chlorine or bromine, and Y represents hydrogen or an alkoxy group.

4. A process for the production of fast shades on textile materials which comprises coupling on the fiber an arylamide of 2-3-hydroxy-naphthoic acid free from water-solubilizing and nitro groups with tetrazotized 4-4′-diamino-5-5′-dimethoxy-2-2′-dimethyl-triphenyl-methane.

5. A process for the production of fast shades on textile materials which comprises coupling on the fiber 2-3-hydroxy-naphthoic-alpha-naphthylamide and tetrazotized 4-4′-diamino-5-5′-dimethoxy-2-2′-dimethyl-triphenyl-methane.

6. Fibers dyed with azo dyes having the following general formula:

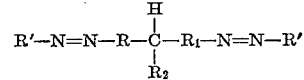

wherein R′ represents the residue of an arylamide of 2-3-hydroxy-naphthoic acid free from water-solubilizing groups, and R, $R_1$ and $R_2$ represent aromatic residues of the benzene series which may have non-water-solubilizing groups substituted thereon and in which members R and $R_1$ have each an alkoxy group ortho to the azo group.

7. Fibers dyed with azo dyes having the following general formula:

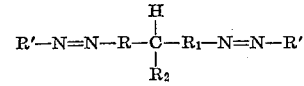

wherein R′ represents the residue of an arylamide of 2-3-hydroxy-naphthoic acid free from water-solubilizing and nitro groups, and R, $R_1$ and $R_2$ represent aromatic residues of the benzene series free from water-solubilizing and nitro groups and in which members R and $R_1$ have each an alkoxy group ortho to the azo group.

8. Fibers dyed with azo dyes having the following general formula:

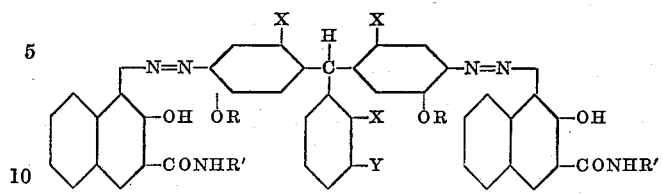

wherein R' represents an aromatic residue of the benzene or naphthalene series which may have substituted thereon members selected from the class consisting of halogen, alkyl, and alkoxy groups, R represents an alkyl group, X represents hydrogen, alkyl, chlorine or bromine, and Y represents hydrogen or an alkoxy group.

9. Fibers dyed with azo dyes having the following general formula:

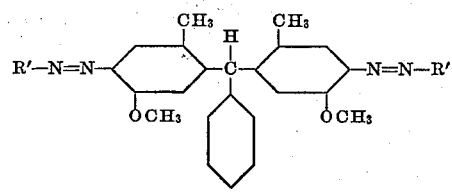

wherein R' represents the residue of an arylamide of 2-3-hydroxy-naphthoic acid free from water-solubilizing and nitro groups.

10. Fibers dyed with an azo dye having the following formula:

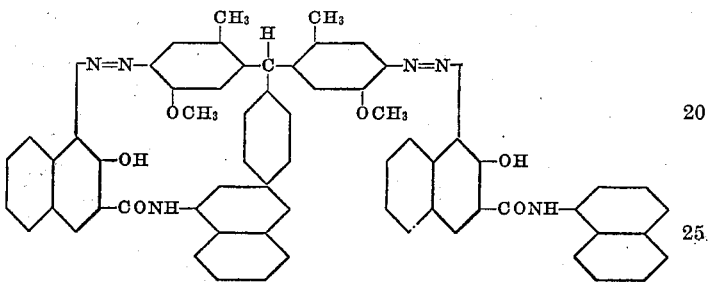

MORDECAI MENDOZA.
WILFRED ARCHIBALD SEXTON.